Jan. 12, 1971  H. T. McELVY  3,553,815
MACHINE FOR ASSEMBLING INSERT INTO LID
Filed June 17, 1968  3 Sheets-Sheet 1

INVENTOR.
H. T. McELVY
BY Young & Quigg
ATTORNEYS

Jan. 12, 1971 H. T. McELVY 3,553,815
MACHINE FOR ASSEMBLING INSERT INTO LID
Filed June 17, 1968 3 Sheets-Sheet 2

INVENTOR.
H. T. McELVY
BY Young & Quigg
ATTORNEYS

INVENTOR.
H. T. McELVY
BY
Young & Quigg
ATTORNEYS

# United States Patent Office 3,553,815
Patented Jan. 12, 1971

3,553,815
MACHINE FOR ASSEMBLING INSERT INTO LID
Howell T. McElvy, Kansas City, Mo., assignor to Phillips Petroleum Company, a corporation of Delaware
Filed June 17, 1968, Ser. No. 737,460
Int. Cl. B23p 19/04, 7/10
U.S. Cl. 29—208                                                10 Claims

ABSTRACT OF THE DISCLOSURE

A machine for assembling a container cover, composed of a lid and a disc insert, has two overlapping horizontal intermittently rotated wheel conveyors. A first vertically reciprocating suction cup pulls a lid from the bottom of a stack of lids and deposits it in an opening in one of the wheel conveyors while a second vertically reciprocating suction cup pulls a disc from the bottom of a stack of discs and deposits it in an opening in the other wheel conveyor. The wheel conveyors are indexed to bring the lid and disc into vertical alignment with each other and a vertically reciprocating plunger which forces the disc into the lid. After the next indexing motion of the wheel conveyor, the assembled cover is pushed upwardly into a stack.

---

Machines for inserting discs into lids have been complicated in construction and operation, as well as being expensive. It is not uncommon to utilize a large number of different schemes of transmitting mechanical motion, any one of which can become inordinately complicated.

Accordingly it is an object of the invention to provide new and improved apparatus for assembling a receptacle and an insert. It is an object of the invention to provide a simplified mechanical power train for a machine. Another object of the invention is to reduce the number of mechanical power transmitting means in an assembling machine.

Other objects, aspects and advantages of the invention will be apparent from a study of the specification, the drawings and the appended claims to the invention.

Figure 1:
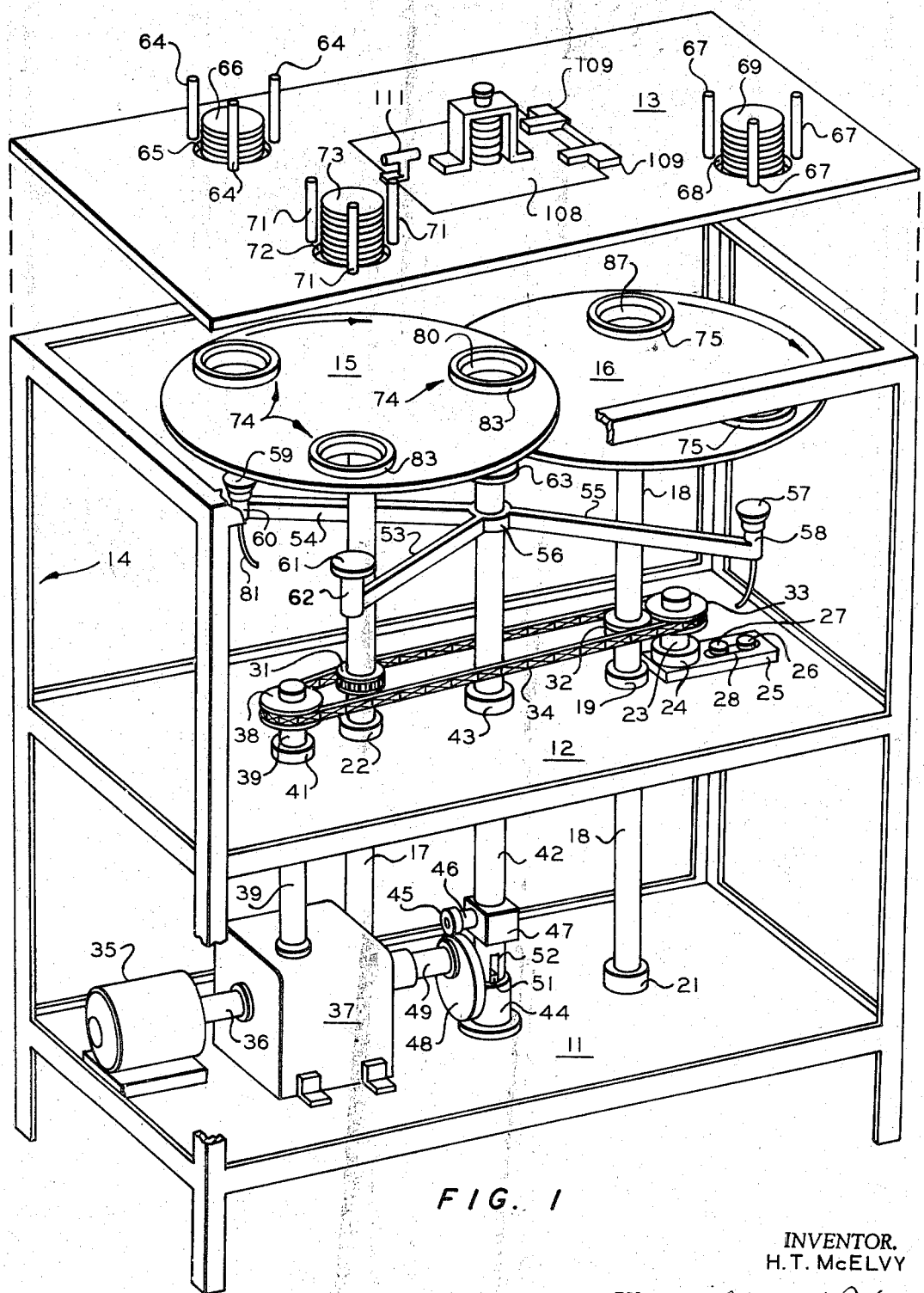
Figure 2:
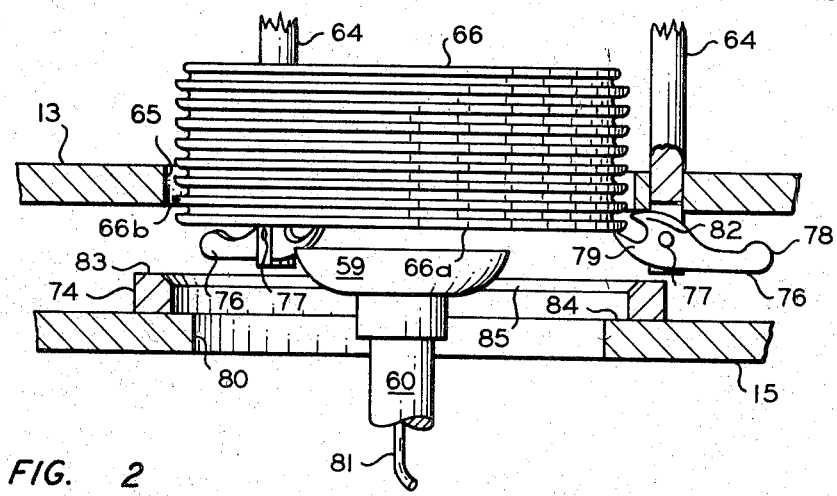
Figure 3:
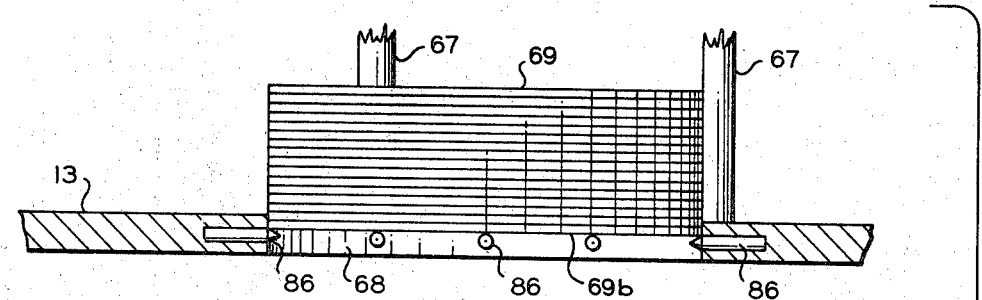
Figure 3:
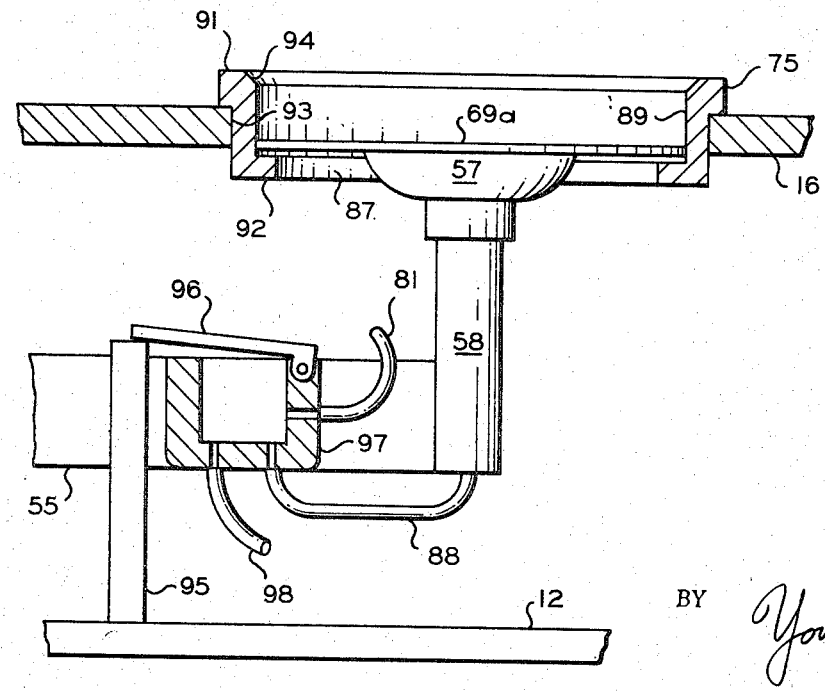
Figures 4, 5:
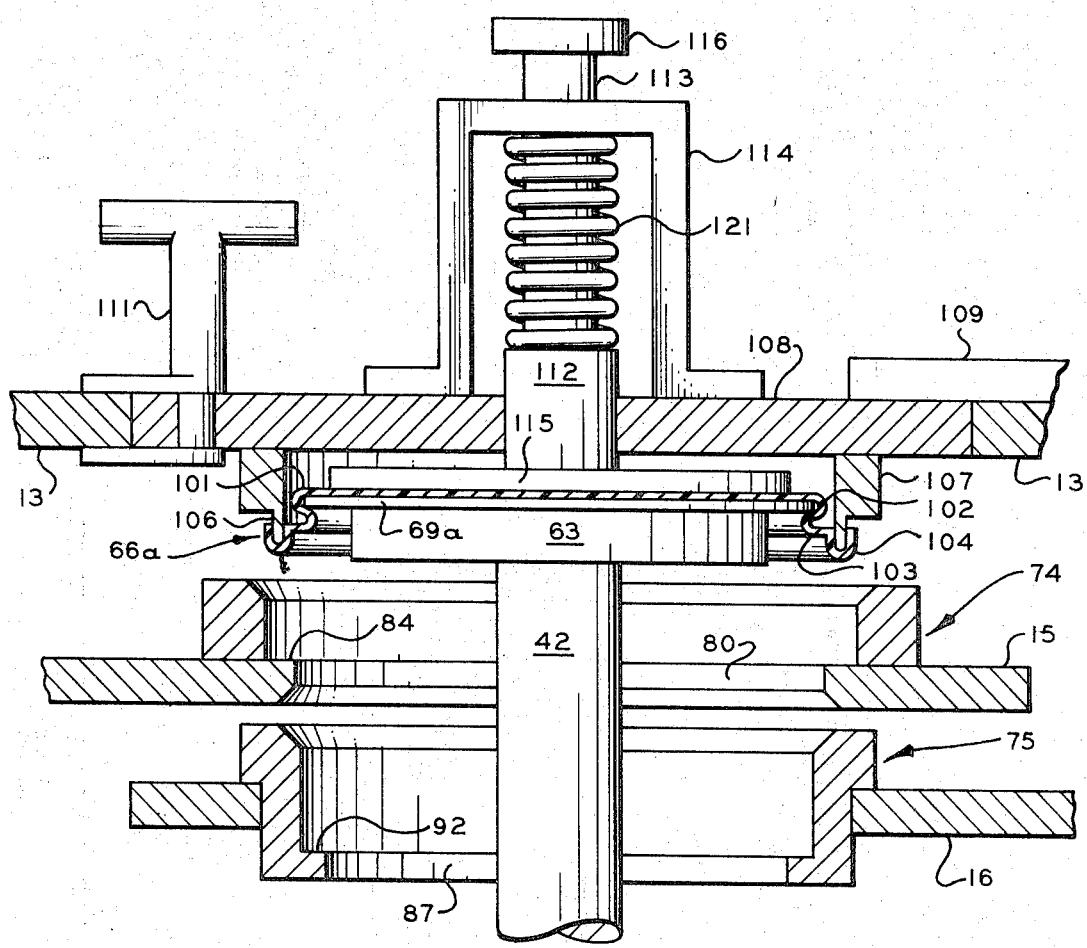

In the drawings, FIG. 1 is a perspective view, partly exploded and partly in cross section of an apparatus in accordance with the invention, FIG. 2 is an elevational view in cross section of the lid dispensing mechanism of the apparatus of FIG. 1, FIG. 3 is an elevational view in cross section of the disc dispensing mechanism, FIG. 4 is an elevational view in cross section of the assembling mechanism, and FIG. 5 is an elevational view in cross section of the stacking mechanism.

Referring now to FIG. 1 in detail, plates 11, 12 and 13 are supported by structural frame 14. Conveyor wheels 15 and 16 are supported on the upper ends of vertical rotatable shafts 17 and 18, respectively. Shaft 18 extends through bushing 19 in plate 12 with the lower end of shaft 18 being rotatably supported by thrust collar 21. Shaft 17 extends through bushing 22 in plate 12 and is supported at its lower end by a thrust collar, not shown. The lower end of idler shaft 23 is rotatably secured in thrust collar 24 located on stud plate 25. Bolts 26 and 27 extend through slot 28 in stud plate 25 to adjustably secure stud plate 25 to plate 12. Sprockets 31, 32 and 33 are secured to shafts 17, 18 and 23 and are simultaneously driven by chain 34. Motor 35 continuously rotates shaft 36 which serves as the input to index drive 37. Chain drive sprocket 38 is secured to the upper end of shaft 39, which is one of the output shafts of index drive 37. Shaft 39 passes through bushing 41 in plate 12. Thus the rotation of shaft 39 causes the simultaneous rotation of conveyor wheels 15 and 16.

Reciprocable shaft 42 passes through bushing 43 in plate 12 and bushing 44 in plate 11. Cam follower 45 is rotatably positioned on shaft 46, the latter being secured by clamp 47 to shaft 42. Cam 48 is mounted on output shaft 49 of index drive 37. The rotation of shaft 49 thus causes the vertical reciprocation of shaft 42. A key 51 in bushing 44 cooperates with keyway 52 in shaft 42 to prevent rotation of shaft 42. Horizontal arms 53, 54 and 55 extend outwardly from hub 56, which is secured to shaft 42. Vacuum cup 57 is supported on vertical arm 58 at the outer end of arm 55, while vacuum cup 59 is supported on vertical arm 60 at the outer end of arm 54. A pusher plate 61 is horizontally positioned on the upper end of vertical arm 62 attached to the outer end of arm 53. A pusher plate 63 is horizontally positioned on the upper end of shaft 42.

Guide bars 64 are positioned around opening 65 in plate 13 to support a stack of inverted lids 66 against lateral movement and in alignment with the lid or receptacle dispensing station of conveyor wheel 15. Guide bars 67 are positioned around opening 68 in plate 13 to provide lateral support for a stack of insert discs 69 positioned in alignment with the insert dispensing station of conveyor wheel 16. Similarly guide bars 71 are positioned around opening 72 in plate 13 in alignment with the stacking station of conveyor wheel 15 to provide lateral support for a stack of lid and disc assemblies 73. Conveyor wheel 15 is provided with three article receiving pockets 74 and conveyor wheel 16 is provided with three article receiving pockets 75. Each article receiving pocket 74 and 75 is provided with an opening through the respective wheel conveyor.

Referring now to FIG. 2, each guide bar 64 extends downwardly a short distance from the lower surface of plate 13 and has a pawl 76 pivotably secured by pin 77 to the lower extension. The outer end 78 of each pawl 76 has sufficient weight to balance the weight of the stack of lids 66 resting on the lower inwardly directed finger 79 of each of the three pawls. Upon upward movement of shaft 42, suction cup 59 passes upwardly through opening 80 in the lid pocket 74 positioned under the stack of lids 66 to contact the lower surface of the lowermost lid 66a in the stack and a vacuum therebetween is created by vacuum line 81. The illustrated position of cup 59 is during the final portion of the upward motion of shaft 42. Upon the downward movement of shaft 42, suction 59 pulls the lowermost lid 66a downwardly from the stack, causing a downward movement of fingers 79. The pivoting of pawls 76 by the downward movement of fingers 79 causes the upper inwardly directed fingers 82 to enter the space between the rim of the lid 66a being withdrawn and the rim of the next adjacent lid 66b in the stack, thus supporting lid 66b and the remainder of the stack while lid 66a is withdrawn. After lid 66a clears finger 79, the weight of the outer ends 78 causes pawls 67 to pivot in the opposite direction, withdrawing upper fingers 82 after fingers 79 are in place to catch and hold the stack. Lower fingers 79 have a longer length from pin 77 than upper fingers 82, thus permitting fingers 79 to reach a holding position before fingers 82 are withdrawn clear of lid 66b. During the downward motion of shaft 42, the withdrawn lid 66a contacts plate 15 around the periphery of opening 80 and the vacuum pressure between cup 59 and lid 66a is released as hereinafter described. Each lid pocket 74 comprises a ring 83 secured to plate 15 and having an inner diameter only slightly larger than the maximum diameter of lids 66. The diameter of each opening 80 is less than the inner diameter of ring 83 to form a support shoulder 84. The upper edge 85 of the inner surface of ring 73 is chamfered or rounded to aid in centering the withdrawn lid 66a as it enters ring 83.

In FIG. 3, a plurality of pins 86 are positioned in plate 13 around opening 68 and extend laterally inwardly toward the center of opening 68 to support the stack of discs 69. During the upward motion of shaft 42, suction cup 57 passes upwardly through opening 87 in the pocket 75 positioned under the stack of discs 69 to contact the lower surface of the lowermost disc 69a in the stack. A vacuum is formed between cup 57 and disc 69a by vacuum line 88 and the initial downward motion of shaft 42 results in disc 69a being withdrawn from the stack of discs. Each pocket 75 comprises an annular ring 89 having an outwardly directed upper shoulder 91 and an inwardly directed lower shoulder 92. The outer diameter of shoulder 91 is greater than the diameter of the opening 93 in plate 16 to provide support for ring 89. The inner diameter of annular ring 89 is slightly greater than the diameter of disc 69, while the inner diameter of shoulder 92 is less than the diameter of disc 69 to support the withdrawn disc 69a in ring 89. The upper edge 94 of the inner surface of ring 89 is chamfered or rounded to aid in centering disc 69a as it enters ring 89. In the illustrated position of cup 57, shaft 42 has moved downwardly sufficiently for stop pin 95 to contact the release plate 96 on vacuum connection 97 to which hoses 81 and 88 are connected. Hose 98 provides communication between connection 97 and a vacuum pump. Continued downward motion of shaft 42 withdraws cup 57 from contact with disc 66a and out of ring 89.

The rotation of shaft 39 to index conveyor wheels 15 and 16 120° in clockwise direction brings the pocket 74 containing lid 66a into overlying relationship with the pocket 75 containing disc 69a at an assembling station as illustrated in FIG. 4. Upon the next upward movement of shaft 42, plate 63 contacts the lower surface of disc 69a and pushes disc 69a upwardly through disc pocket 75 into contact with the lower surface of inverted lid 66a. Lid 66a has a closure member 101; a wall member having an outwardly directed groove 102, adapted to receive and hold a disc, and an inwardly directed shoulder 103, adapted to serve as a stacking shoulder, and a U-shaped rim 104. Upon continued upward motion of shaft 42, plate 63 pushes lid 66a upwardly out of pocket 74 until the U-shaped rim 104 is engaged on annular member 106 extending downwardly from ring member 107. Member 107 is attached to the lower surface of a door 108 which is secured in an opening in plate 13 by hinges 109 and latch 111. The continued upward motion of shaft 42 results in a slight flexing of the lid wall, permitting disc 69a to be pushed int groove 102. Compression spring 121 is positioned between a shoulder 112 on bar 113 and member 114 to resiliently bias backup plate 115 downwardly against the upper surface of inverted lid 66a. Outwardly extending shoulder 116 on bar 113 above member 114 serves as a stop to limit the downward travel of plate 115.

After the completion of the assembling operation, shaft 42 and plate 63 are withdrawn downwardly. Plate 115 moves downwardly under the action of compression spring 121 forcing the assembled lid and disc from ring member 107 and leaving the assembled lid and disc resting on shoulder 84 of pocket 74, and plates 15 and 16 are thereafter rotated 120°. This rotation of plate 15 brings the assembly 73 of lid 66a and disc 69a into the stacking station in alignment with opening 72 in plate 13 and with pusher plate 61. The next upward movement of shaft 42 causes plate 61 to push the assembly 73 upwardly against the bottom assembly in the stack, raising the entire stack. The rim of the assembly of lid 66a and disc 69a catches the finger 117 on each of retaining pawls 118 and causes the pawls to pivot about pins 119 by which they are secured to the lower ends of guide bars 71. After a certain extent of upward motion of plate 61, fingers 117 clear the rim of the lowermost assembly and return to a substantially horizontal position. The lower end of each of pawls 118 is shaped to provide arresting contact with a plate 121 when the finger 117 reaches the horizontal position on the downward swing, while the upper surface is curved to permit the pawl to rotate when upward pressure is applied to finger 117.

Thus the assembly machine has a lid feeding or receptacle dispensing station, a disc feeding or insert dispensing station, an assembling station and an assembly stacking station. Conveyor 15 has a receptacle dispensing station, an assembling station, and a stacking station, while conveyor 16 has an insert dispensing station and an assembling station, with conveyors 15 and 16 being positioned so that the assembling station of conveyor 15 is in alignment with the assembling station of conveyor 16. While the invention has been described in terms of a presently preferred embodiment wherein the receptacles are container lids and the inserts are discs to be inserted into the container lids, the invention can be employed with other receptacles and inserts. All of the mechanical operations are conducted by alternating the vertical reciprocation of shaft 42 and the rotation of shafts 17 and 18. In one specific embodiment of the invention during the first portion of the cycle of rotation of shaft 36, shaft 42 is actuated upwardly for cup 59 to engage a lid in the lid feeding station, for cup 57 to engage a disc in the disc feeding station, for a plate 63 to push a disc into a lid in the assembling station and for plate 61 to push a completed assembly above the fingers 117 in the stacking station, and then downwardly for cup 59 to deposit the withdrawn lid in the pocket 74 positioned in the lid feeding station, for cup 57 to deposit the withdrawn disc in the pocket 75 in the disc feeding station, for the completed assembly to be returned to pocket 74 in the assembling station and for the stack of assemblies to be positioned on fingers 117. During the second portion of the cycle of rotation of shaft 36, shafts -17 and 18 are rotated 120° to carry the pockets 74 and 75, respectively, from one station to the next station. Thus only vertical reciprocation is utilized during the first time period and only rotation is utilized during the second time period, to accomplish all the functions of the machine. This simplicity of the mechanical actuation means greatly reduces the complexity and cost of the machine in comparison to previous assembling systems.

While only three pockets 74 and three pockets 75 have been illustrated with a single lid feeding station, a single disc feeding station, a single assembling station and a single stacking station, other combinations can be employed while retaining the advantages of the invention. A blank station could be added for each of wheels 15 and 16 by utilizing four pockets on each wheel. With six pockets on each of wheels 15 and 16, two disc feeding stations, two lid feeding stations, two assembling stations and two stacking stations could be employed, thereby doubling the output of the machine with only a slight addition in components and no additional mechanical actuation means being required. In this instance the shafts 17 and 18 would still rotate 120° at a time, but each pocket would be moved two spaces.

Reasonable variations and modifications are possible within the scope of the foregoing disclosure, the drawings and the appended claims to the invention.

I claim:

1. Apparatus comprising:
    first and second rotatable wheel conveyors, each of said conveyors having a plurality of article receiving pockets, each of said pockets having an opening through the respective wheel conveyor; said first conveyor having at least a receptacle dispensing station, an assembling station, and a stacking station; said second conveyor having at least an insert dispensing station and an assembling station; said first and second conveyors being positioned so that said assembling station of said second conveyor is in alignment with said assembling station of said first conveyor;
    means for positioning a stack of receptacles in alignment with said receptacle dispensing station;
    means for positioning a stack of inserts in alignment with said insert dispensing station;
    means in alignment with said stacking station for receiving a stack of completed assemblies of insert and receptacle;

means for intermittently rotating said first and second conveyors to index each of the pockets from one station to another station;

first and second vacuum means;

means for reciprocating said first vacuum means through the opening in the pocket of said first conveyor positioned at said receptacle dispensing station into contact with the first receptacle in the bottom of said stack of receptacles and withdrawing said first receptacle from the bottom of said stack of receptacles and depositing the thus withdrawn first receptacle into said pocket positioned at said receptacle dispensing station;

means for reciprocating said second vacuum means through the opening in the pocket of said second conveyor positioned at said insert dispensing station into contact with the first insert in the bottom of said stack of inserts and withdrawing said first insert from the bottom of said stack of inserts and depositing the thus withdrawn first insert into said pocket positioned at said insert dispensing station;

means in alignment with said assembling stations for for forcing the insert positioned in the assembling station pocket of said second conveyor into the receptacle positioned in the assembling station pocket of said first conveyor; and means for reciprocating through the stacking station pocket of said first wheel conveyor to transfer a completed assembly from said stacking station pocket into said means for receiving completed assemblies.

2. Apparatus in accordance with claim 1 further comprising a holding member and a resiliently biased backup plate positioned in alignment with said assembling stations, said means for forcing being adapted to move said insert positioned in the assembling station pocket of said second conveyor into contact with the receptacle positioned in the assembling station pocket of said first conveyor and to move the thus contacted insert and receptacle against said resiliently biased backup plate until the movement of the receptacle is stopped by said holding member.

3. Apparatus in accordance with claim 2 wherein said means for reciprocating said first vacuum means, said means for reciprocating said second vacuum means, said means for forcing the insert positioned in the assembling station pocket of said second conveyor, and said means for reciprocating through the stacking station are moved in unison.

4. Apparatus in accordance with claim 1 wherein said means for reciprocating said first vacuum means, said means for reciprocating said second vacuum means, said means for forcing the insert positioned in the assembling station pocket of said second conveyor, and said means for reciprocating through the stacking station are connected to a common reciprocatable shaft.

5. Apparatus in accordance with claim 4 further comprising means for alternately actuating said means for intermittently rotating and said common reciprocatable shaft.

6. Apparatus in accordance with claim 5 wherein said first and second vacuum means are first and second vacuum cups, respectively; and further comprising a vacuum source, means connected to said vacuum source and adapted to apply a vacuum to said first and second vacuum cups, and means responsive to the movement of said common reciprocatable shaft away from said stacks to discontinue the application of said vacuum to said first and second vacuum cups.

7. Apparatus in accordance with claim 6 wherein said first and second conveyors are horizontally positioned wheels, said first conveyor being positioned above and overlapping a portion of said second conveyor, said stacks of receptacles, inserts and completed assemblies being positioned above the respective conveyors, and said common reciprocatable shaft being reciprocatable in a substantially vertical direction.

8. Apparatus in accordance with claim 7 wherein said first and second vacuum cups and said means to transfer a completed assembly are mounted on arms connected to said common reciprocatable shaft, and said means for forcing is connected to an upper portion of said common reciprocatable shaft.

9. Apparatus in accordance with claim 8 wherein said opening in the pockets of said first conveyor are smaller than the receptacles and larger than the inserts.

10. Apparatus in accordance with claim 9 wherein said means for positioning a stack of receptacles comprises a plurality of pivoted pawls having upper and lower inwardly extending fingers to support said stack of receptacles and permit the withdrawl of only one receptacle at a time, said pawls having means to urge said lower fingers up against said stack of receptacles except when said first suction cup pulls the lowermost receptacle downwardly, the downward movement of said lower fingers causing the upper fingers to engage the next receptacle in the stack, the subsequent upwardly motion of said lower fingers placing said lower fingers in a supporting position before said upper fingers are withdrawn from engagement with said next receptacle.

References Cited

UNITED STATES PATENTS

| | | | |
|---|---|---|---|
| 3,024,523 | 3/1962 | Donaldson | 29—208 |
| 3,248,785 | 5/1966 | Aidlin | 29—208 |

THOMAS H. EAGER, Primary Examiner

U.S. Cl. X.R.

29—211